(12) United States Patent  
Yonekura et al.

(10) Patent No.: US 7,865,052 B2
(45) Date of Patent: Jan. 4, 2011

(54) OPTICAL WAVEGUIDE HAVING AN OPTICAL TRANSMISSION DIRECTION CHANGING PART

(75) Inventors: Hideki Yonekura, Nagano (JP); Takanori Yamamoto, Nagano (JP); Kazunao Yamamoto, Nagano (JP); Kenji Yanagisawa, Nagano (JP)

(73) Assignee: Shinko Electric Industries Co., Ltd., Nagano (JP)

( * ) Notice: Subject to any disclaimer, the term of this patent is extended or adjusted under 35 U.S.C. 154(b) by 0 days.

(21) Appl. No.: 12/412,430

(22) Filed: Mar. 27, 2009

(65) Prior Publication Data

US 2009/0245726 A1    Oct. 1, 2009

(30) Foreign Application Priority Data

Apr. 1, 2008    (JP)    ............... 2008-095298

(51) Int. Cl.
    *G02B 6/10*    (2006.01)
(52) U.S. Cl. .................. 385/129; 385/14; 385/47
(58) Field of Classification Search .......... 385/14, 385/129–132
    See application file for complete search history.

(56) References Cited

U.S. PATENT DOCUMENTS 6,259,841 B1 *   7/2001   Bhagavatula ............ 385/47

6,850,674 B2 *   2/2005   Haraguchi et al. ........... 385/49
2004/0131302 A1 *  7/2004   Kouta et al. .................. 385/14
2006/0110114 A1 *  5/2006   Yanagisawa et al. ........ 385/129
2006/0245681 A1 *  11/2006  Uchida ........................ 385/14

FOREIGN PATENT DOCUMENTS

| JP | 6-265738 A | 9/1994 |
| JP | 2001-272565 A | 10/2001 |
| JP | 2002-131586 A | 5/2002 |
| JP | 2007-183467 A | 7/2007 |
| JP | 2007-183468 A | 7/2007 |

* cited by examiner

Primary Examiner—Charlie Peng
(74) Attorney, Agent, or Firm—IPUSA, PLLC

(57) ABSTRACT

An optical waveguide includes: a first clad layer; a core layer formed on the first clad layer; a second clad layer formed on the core layer; and an optical transmission direction changing part. The optical transmission direction changing part is configured and arranged to change a transmission direction of a light transmitting through the core layer. The optical transmission direction changing part penetrates through the core layer. An optical transmission direction changing surface of the optical transmission direction changing part inclines relative to a predetermined reference plane by a predetermined angle.

9 Claims, 12 Drawing Sheets

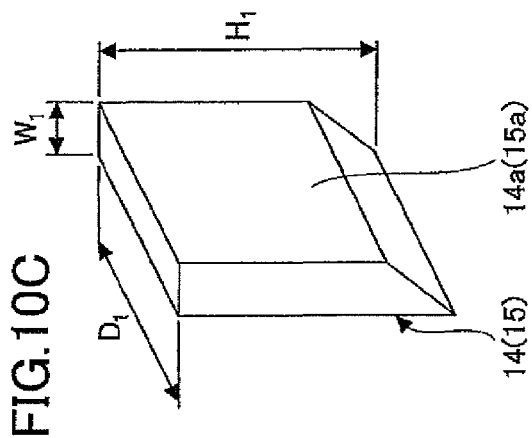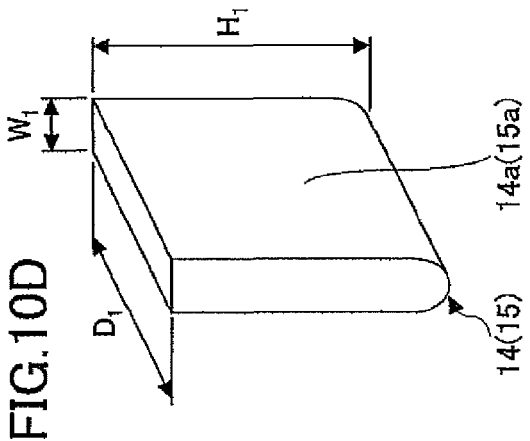

OPTICAL WAVEGUIDE HAVING AN OPTICAL TRANSMISSION DIRECTION CHANGING PART

CROSS-REFERENCE TO RELATED APPLICATIONS

This application is based upon and claims the benefit of priority of the prior Japanese Patent Application No. 2008-095298, filed on Apr. 1, 2008, the entire contents of which are incorporated herein by reference.

FIELD

The embodiment discussed herein is directed to an optical waveguide and an optical transmission/reception device having an optical waveguide.

BACKGROUND

In recent years, operation speeds (operation clocks) of processors such as a central processing unit (CPU) have been increased due to an increase in a wiring density in internal structures of integrated circuits. However, a signal transmission speed in electronic transmission systems has reached almost its limit, which causes a bottleneck for increasing a processing speed of CPUs. Additionally, with an increase in an operation speed (operation clock) of CPUs, generation of a cross-talk noise due to high-density wiring and generation of electromagnetic interference (EMI) noise have become problematic. Therefore, it is necessary to take measures to eliminate such a noise problem.

As measures for eliminating the above-mentioned noise problem, an optical interconnection system (optical wiring system) using an optical waveguide has attracted attention. The optical interconnection method is capable of performing a transmission with a considerably larger band as compared to an electric transmission system. Thus, the optical interconnection method can contribute to a speed-up of a processing speed, and enables the construction of a signal transmission system using optical parts of a small-size and low-power consumption. Additionally, the optical interconnection method is capable of suppressing generation of a cross-talk noise and an EMI noise.

FIG. 1 is a cross-sectional view illustrating an optical transmission/reception device 200 having a conventional optical waveguide 100. The optical transmission/reception device 200 illustrated in FIG. 1 includes the optical waveguide 100, a light-emitting element 201 having a light-emitting part 201a, and a light-receiving element 202 having a light-receiving part 202a. The optical waveguide 100 includes a support board 101, a core layer 102, a clad layer 103, slots 104 and 105, and metal layers 106 and 107. An angle $\theta_1$ illustrated in FIG. 1 is 45 degrees.

In the optical waveguide 100, the core layer 102 and the clad layer 103 are formed on the support board 101. The clad layer 103 includes a first clad layer 103a and a second clad layer 103b between which the core layer 102 is situated. The slots 104 and 105 penetrate the core layer 102 and the clad layer 103.

The metal layer 106 is formed in a 45-degree inclination part of the slot 104, and the metal layer 107 is formed in a 45-degree inclination part of the slot 105. The light-emitting element 201 having the light-emitting part 201a is arranged above the slot 104 of the optical waveguide 100, and the light-receiving element 202 having the light-receiving part 202a is arranged above the slot 105.

In the optical transmission/reception device 200, a light emitted from the light-emitting part 201a of the light-emitting element 201 is incident on the optical waveguide 100, and the transmission direction of the light is changed by about 90 degrees. Then, the light travels in the slot 104 and is incident on the core layer 102. Because the refractive index of the core layer 102 is set higher than the refractive index of the clad layer 103, the light incident on the core layer 102 does not transmit to the clad layer 103 and propagates inside the core layer 102.

The light which propagates inside the core layer 102 reaches the metal layer 107, which changes the transmission direction of the light by about 90 degrees. Thus, the light deflected by the metal layer 107 is incident on the light-receiving part 202a of the light-receiving element 202. As mentioned above, the metal layers 106 and 107 formed in the 45-degree inclination parts of the slots 104 and 105 serve as an optical transmission direction changing part to change the transmission direction of the light traveling through the optical waveguide 100 in the optical transmission/reception device 200.

The optical waveguide 100 illustrated in FIG. 1 is manufactured by forming the core layer 102 and the clad layer 103 on the support board 101, forming the slots 104 and 105 having the 45-degree inclination parts, which penetrate the core layer 102 and the clad layer 103, in the core layer 102 and the clad layer 103, and further forming the metal layers 106 and 107 in the 45-degree inclination parts of the slots 104 and 105, respectively.

The slots 104 and 105 having the 45-degree inclination parts can be formed by a dicing method, a mold transfer method, or the like. As a method of forming the slots 104 and 105, there is suggested a method of dry-etching by patterning a photo resist using a photo mask having a mask pattern, which has an opening of which size or density gradually increases or decreases in a longitudinal direction of the optical waveguide 100. Also suggested is a method of controlling an amount of diffraction of a curing light by exposing a photo mask, when forming the core layer 102, while separating the photo mask from a surface of a material forming the core layer 102 by a distance equal to or larger than 500 μm.

As another example of the optical waveguide, it is suggested to use a mirror member having a mirror surface instead of forming the slots 104 and 105 having the inclination surfaces and the metal layers 106 and 107. Such an optical waveguide is fabricated by embedding the mirror members in a liquid material, which forms the optical waveguide, and, thereafter, curing the liquid material in the manufacturing process of the optical waveguide.

The following Patent Documents disclose conventional optical waveguides such as mentioned above.

Patent Document 1: Japanese Laid-Open Patent Application No. 6-265738
Patent Document 2: Japanese Laid-Open Patent Application No. 2001-272565
Patent Document 3: Japanese Laid-Open Patent Application No. 2002-131586
Patent Document 4: Japanese Laid-Open Patent Application No. 2007-183467
Patent Document 5: Japanese Laid-Open Patent Application No. 2007-183468

In the manufacturing method of the optical waveguide 100, there is a problem in that the process of forming the metal layers 106 and 107 on the 45-degree inclination parts by using a sputtering method, an electroless plating method or the like must be performed after formation of the slots 104 and 105 having the 45-degree inclination parts, which makes the manufacturing process of the optical waveguide 100 complicated.

This is because a mask to partially form the metal layers 106 and 107 in the process of forming the metal layers 106 and 107 on the 45-degree inclination parts, and the positioning between the mask and each of the 45-degree inclination parts of the minute slots 104 and 105 is difficult. Additionally, the metal layers 106 and 107 must be formed in the optical waveguide 100 one by one.

Moreover, in the structure using a mirror member having a mirror surface instead of the slots 104 and 105 having the inclination parts and the metal layers 106 and 107, a material which can be used for forming the optical waveguide is limited to a liquid material, which raises a problem in that a film-like material cannot be used as a material for forming the optical waveguide.

SUMMARY

It is a general object of the present invention to provide an optical waveguide in which the above-mentioned problems are eliminated.

A more specific object of the present invention is to provide an optical waveguide, which does not use a specially selected material and permits an optical transmission direction changing part to be formed by a simple process.

According to an aspect of the invention, there is provided a manufacturing method of an optical waveguide having an optical transmission direction changing part that changes a transmission direction of a light traveling through the optical waveguide, the manufacturing method comprising: forming a first clad layer; forming a core layer on the first clad layer; forming a second clad layer on the core layer; and thrusting the optical transmission direction changing part into the first clad layer by penetrating through the second layer and the core layer so that an optical transmission direction changing surface of the optical transmission direction changing part inclines relative to a predetermined reference plane by a predetermined angle.

There is provided according to another aspect of the invention, an optical waveguide comprising: a first clad layer; a core layer formed on the first clad layer; a second clad layer formed on the core layer; and an optical transmission direction changing part configured and arranged to change a transmission direction of a light transmitting through the core layer, wherein the optical transmission direction changing part penetrates through the core layer, and an optical transmission direction changing surface of the optical transmission direction changing part inclines relative to a predetermined reference plane by a predetermined angle.

There is provided according a further aspect of the invention an optical transmission/reception device comprising: a light-emitting element; a light-receiving element; a board; and an optical waveguide formed on the board and arranged between the light-emitting element and the light-receiving element, the optical wave guide having two optical transmission direction changing parts that change a transmission direction of a light transmitting through the optical waveguide, wherein the light-emitting element is arranged on the optical waveguide to project a light onto one of the optical transmission direction changing parts, and the light-receiving element is arranged on the optical waveguide to receive the light of which transmission direction is changed by the other of the optical transmission direction changing parts.

According to the above-mentioned invention, the optical waveguide does not use a specially selected material and permits the optical transmission direction changing part to be formed by a simple process.

The object and advantages of the embodiment will be realized and attained by means of the elements and combinations particularly pointed out in the appended claims.

It is to be understood that both the foregoing general description and the following detailed description are exemplary explanatory only and are not restrictive of the invention, as claimed.

BRIEF DESCRIPTION OF DRAWINGS

FIGS. 10A through 10E are perspective views of an optical transmission direction changing part;

DESCRIPTION OF EMBODIMENT(S)

Preferred embodiments of the present invention will be explained with reference to the accompanying drawings.

First Embodiment

Figure 2:
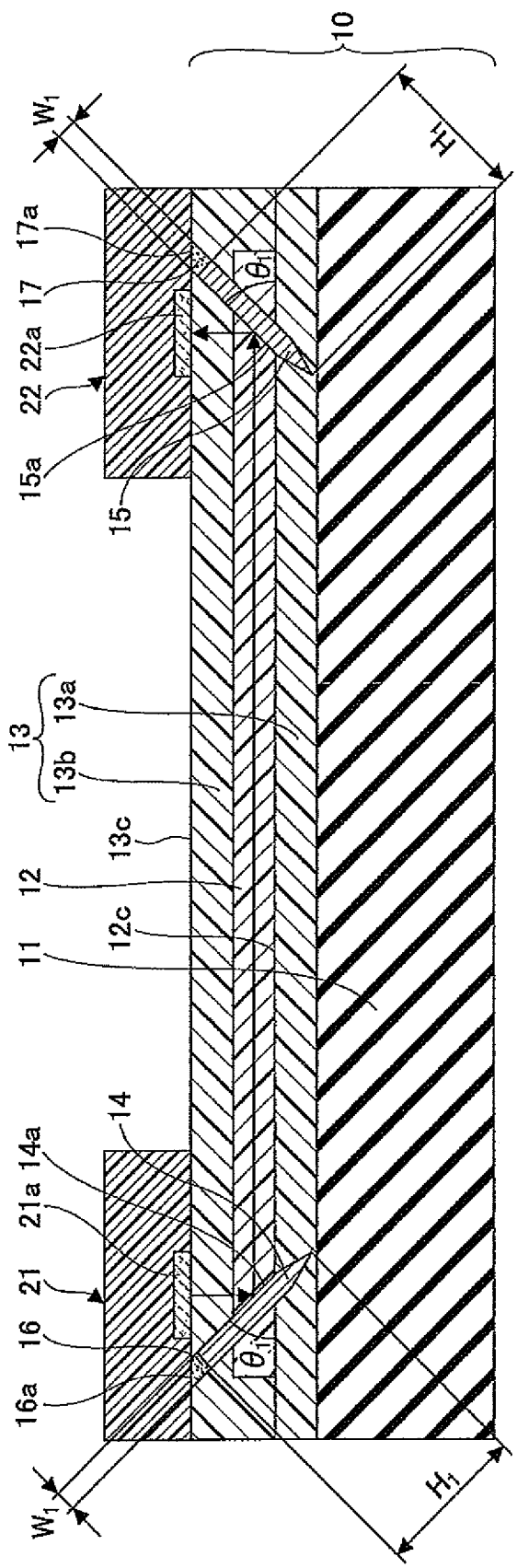
FIG. 2 is a cross-sectional view of an optical transmission/reception device having an optical waveguide according to a first embodiment of the present invention.
Figure 3:
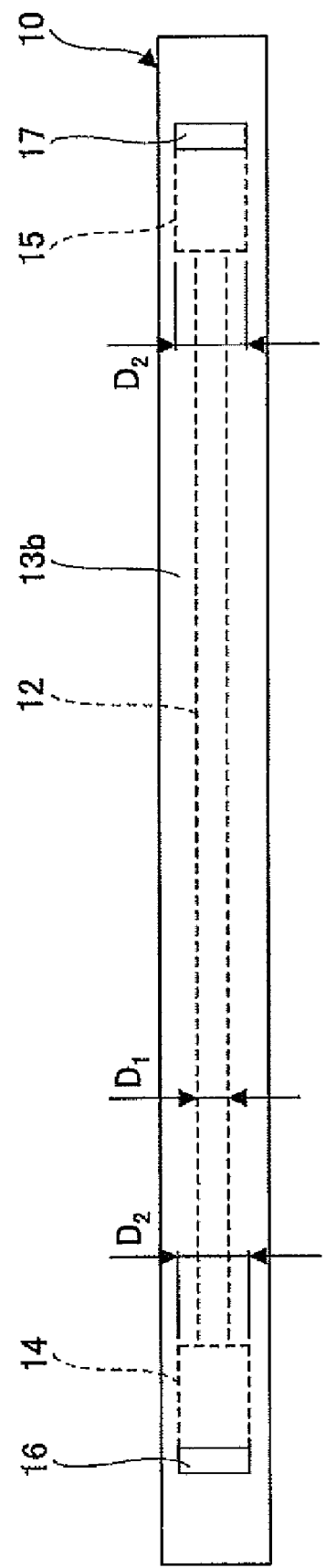
FIG. 3 is a plan view of the optical waveguide according to the first embodiment of the present invention.

FIG. 2 is a cross-sectional view of an optical transmission/reception device 20 having an optical waveguide 10 according to a first embodiment of the present invention. FIG. 3 is a plan view illustrating the optical waveguide 10 according to the first embodiment of the present invention. With reference to FIG. 2 and FIG. 3, the optical transmission/reception device 20 includes the optical waveguide 10, a light-emitting element 21 having a light-emitting part 21a, and a light-receiving element 22 having a light-receiving part 22a.

The optical waveguide 10 includes a support board 11, a core layer 12, a clad layer 13, optical transmission direction changing parts 14 and 15, and encapsulation parts 16 and 17. The clad layer 13 includes a first clad layer 13a and a second clad layer 13b.

In FIG. 2 and FIG. 3, reference numeral 12c indicates a bottom surface of the core layer 12, and reference numeral 13c indicates a top surface of the second clad layer 13b. Reference numerals 14a and 15a indicate optical transmission direction changing surfaces of the optical transmission direction changing parts 14 and 15, respectively. Reference numerals 16a and 17a indicate top surfaces of the encapsulation parts 16 and 17, respectively, Reference letter $D_1$ indicates a width of the core layer 12. Reference letter $W_1$ indicates a width of each of the optical transmission direction changing parts 14 and 15. Reference letter $H_1$ indicates a length of each of the optical transmission direction changing parts 14 and 15 in a longitudinal direction thereof. Reference letter $D_2$ indicates a width of each of the optical transmission direction changing parts 14 and 15.

The optical transmission direction changing surfaces 14a and 15a of the optical transmission direction changing parts 14 and 15 are arranged to form a predetermined inclination angle relative to a predetermined reference plane so that a direction of a light incident thereon can be changed. The predetermined reference plane corresponds to, for example, the bottom surface 12c of the core layer 12. The predetermined inclination angle corresponds to an angle $\theta_1$, which is formed between the bottom surface 12c of the core layer 12 and each of the optical transmission direction changing surfaces 14a and 15a of the optical transmission direction changing parts 14 and 15. The angle $\theta_1$ is set to, for example, 45 degrees.

In the optical waveguide 10, the core layer 12 and the clad layer 13 are formed on the support board 11. The core layer 12 and the clad layer 13 are made of, for example, a polymer material, such as a polyimide resin, an acrylic resin, an epoxy resin, a polyolefin resin, a polynolybornene resin, or a fluoride of the aforementioned chemical compounds, which are liquid material, or a polymer material such as an epoxy base film-like material.

The optical transmission direction changing parts 14 and 15 are provided to penetrate the core layer 12. Each of the optical transmission direction changing parts 14 and 15 is a metal block (metal piece) made of, for example, stainless steel, aluminum or brass which is an alloy of Cu and Zn. The optical transmission direction changing surfaces 14a and 15a of the optical transmission direction changing parts 14 and 15 are flat and smooth surfaces, which are processed by physical or chemical lapping in order to provide a function of reflecting a light. Metal layers such as, for example, Al, Au or the like may be formed on the optical transmission direction changing surfaces 14a and 15a by a sputtering method, a plating method or the like.

Figure 1:
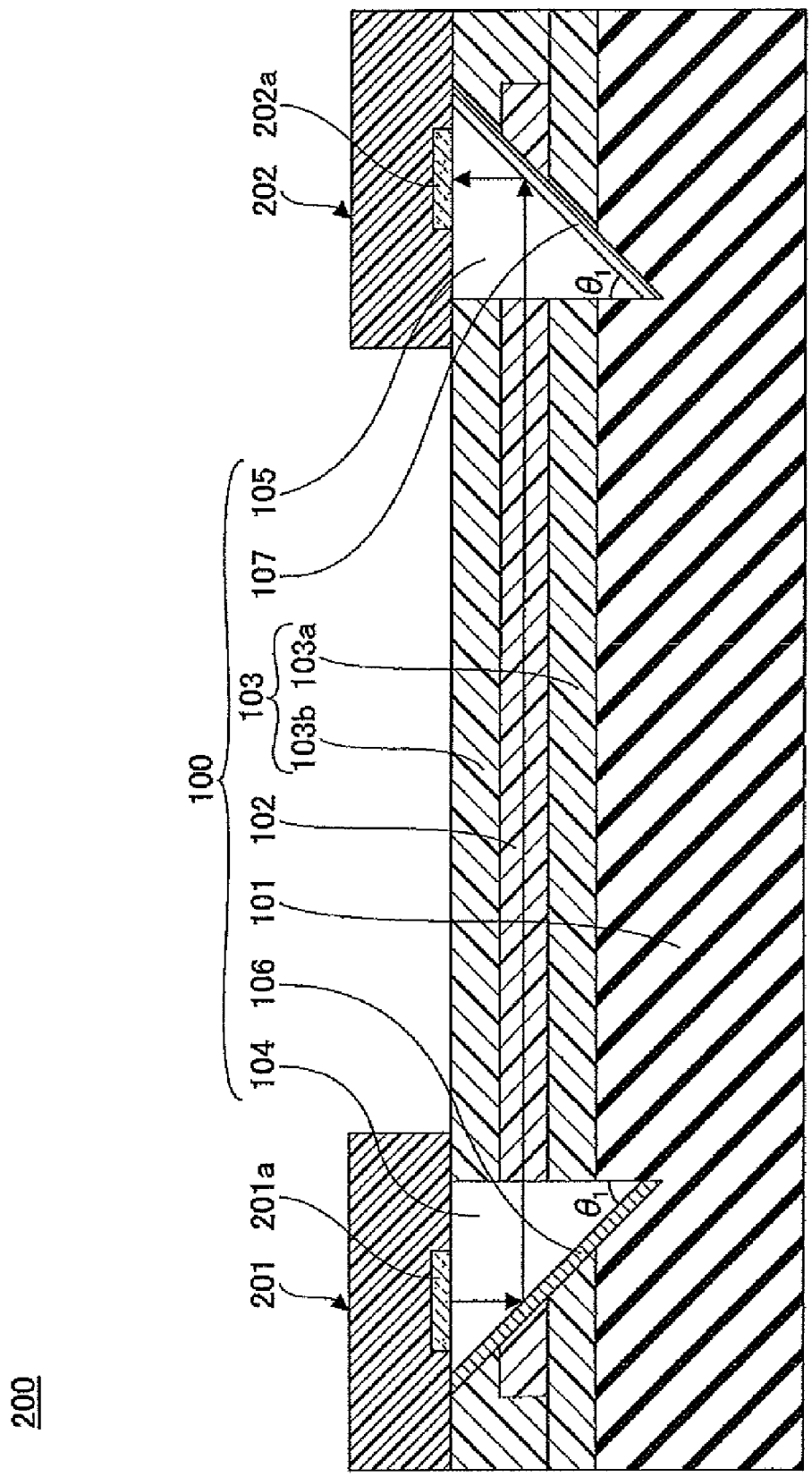
FIG. 1 is a cross-sectional view of an optical transmission/reception device having an optical waveguide.

Unlike the process of forming the metal layers 106 and 107 on the 45-degree inclination parts of the optical waveguide 100 illustrated in FIG. 1, the process of forming the metal layers on the optical transmission direction changing surfaces 14a and 15a of the optical transmission direction changing parts 14 and 15 does not require a positioning with a mask. The metal layers can be formed on a plurality of metal blocks, which are formed into the optical transmission direction changing parts 14 and 15, simultaneously, which reduces a process time. There is no problem if the metal layer is formed on a surface other than the optical transmission direction changing surfaces 14a and 15a of the metal blocks, which are formed into the optical transmission direction changing parts 14 and 15.

In addition, although the angle $\theta_1$ between the bottom surface 12c of the core layer 12 and each of the optical transmission direction changing surfaces 14a and 15a of the optical transmission direction changing parts 14 and 15 is 45 degrees in the example illustrated in FIG. 2, it is not necessary to always set the angle $\theta_1$ to 45 degrees. The angle $\theta_1$ can be set to an arbitrary angle if such an angle provides a good optical coupling between the optical waveguide 10 and each of the light-emitting element 21 and the light-receiving element 22. The angle $\theta_1$ on a side of the light-emitting element 21 (left side in the figure) may be set to an angle different from the angle $\theta_1$ on a side of the light-receiving element 22 (right side in the figure).

The optical transmission direction changing parts 14 and 15 are encapsulated by the encapsulation parts 16 and 17. The top surfaces 16a and 17a of the encapsulation parts 16 and 17 and the top surface 13c of the second clad layer 13b are arranged substantially in the same plane. The encapsulation parts 16 and 17 are made of an adhesive having a refraction index substantially equal to a refraction index of the core layer 12. The encapsulation parts 16 and 17 are provided to improve a mechanical strength of the portions in which the optical transmission direction changing parts 14 and 15 are provided, and also to improve the optical coupling between the core layer 12 and each of the light-emitting element 21 and the light-receiving element 22. However, if the optical transmission direction changing parts 14 and 15 are fixed with sufficient strength to the core layer 12 and the clad layer 13, the encapsulation parts 16 and 17 may be omitted.

The light-emitting part 21a of the light-emitting element 21 and the light-receiving part 22a of the light-receiving element 22 are arranged on the top surface 13c of the second clad layer at positions above the optical transmission direction changing surfaces 14a and 15a of the optical transmission direction changing parts 14 and 15, respectively. The light-emitting element 21 is arranged to project a light onto the optical transmission direction changing surface 14a of the optical transmission direction changing part 14. The light-receiving element 22 is arranged to receive a light of which transmission direction is changed by the optical transmission direction changing surface 15a of the optical transmission direction changing part 15. For example, a semiconductor laser or the like may be used as the light-emitting element 21 and a photo diode or the like may be used as the light-receiving element 22.

In the optical transmission/reception device 20, a light projected from the light-emitting part 21a of the light-emitting element 21 is incident on the optical waveguide 10 and transmitted to the optical transmission direction changing surface 14a of the optical transmission direction changing part 14. Then, the transmission direction of the light is changed by about 90 degrees, as indicated by arrows in FIG. 2, by being reflected by the optical transmission direction changing surface 14a of the optical transmission direction changing part 14, and the light is incident on the core layer 12.

The light propagating inside the core layer 12 reaches the optical transmission direction changing surface 15a of the optical transmission direction changing part 15. Then, the transmission direction of the light is changed by about 90 degrees by being reflected by the optical transmission direction changing surface 15a of the optical transmission direction changing part 15, and the light is incident on the light-receiving part 22a of the light-receiving element 22. As mentioned above, the optical transmission direction changing parts 14 and 15 have the function to change a transmission direction of a light.

A description will be given below of a manufacturing method of the optical waveguide 10 according to the first embodiment of the present invention. FIG. 4 through FIG. 9 are illustrations for explaining a manufacturing process of the optical waveguide 10 according to the first embodiment of the present invention. In FIG. 4 through FIG. 9, parts that are the same as the parts illustrated in FIG. 2 and FIG. 3 are given the same reference numerals, and descriptions thereof may be omitted.

Figure 4:
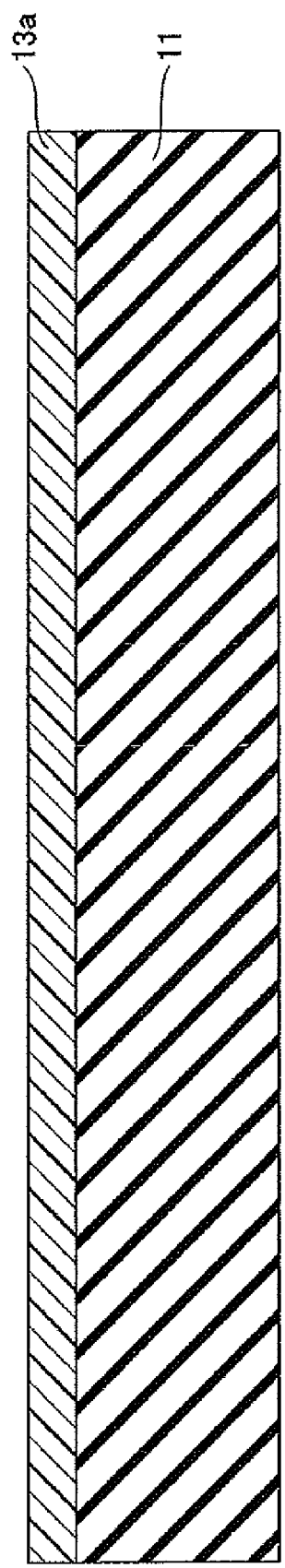
FIG. 4 is an illustration for explaining a first part of a manufacturing process of the optical waveguide according to the first embodiment of the present invention.

First, in the process illustrated in FIG. 4, the support board 11 is prepared and the clad layer 13a is formed on the support board 11. As the support board 11, for example, a glass substrate, a silicon substrate or the like can be used. A board on which electric circuits are formed may be used as the support board 11, and the first clad layer 13a may be formed directly on the board.

The first clad layer 13a can be formed by applying a polymer material, such as a polyimide resin, an acrylic resin, an epoxy resin, a polyolefin resin, a polynolybornene resin, or a fluoride of the aforementioned chemical compounds, which are liquid material, and, thereafter, curing the polymer material by irradiating an ultraviolet light and heating. Alternatively, the first clad layer 13a may be formed by laminating a polymer material such as an epoxy base film-like material or the like on the support board 11, and, thereafter, curing the polymer material by irradiating an ultraviolet light and heating the polymer material. The thickness of the first clad layer 13a can be set to 10 μm to 60 μm.

Subsequently, in the process illustrated in FIG. 5, a core layer 12a is formed on the first clad layer 13a. The core layer 12a is patterned to be changed to the core layer 12. The core layer 12a can be formed by applying a polymer material, such as a polyimide resin, an acrylic resin, an epoxy resin, a polyolefin resin, a polynolybornene resin, or a fluoride of the aforementioned chemical compounds, which are liquid material, onto the first clad layer 13a and, thereafter, curing the polymer material by irradiating an ultraviolet light and heating the polymer material. Alternatively, the core layer 12a can be formed by laminating a polymer material such as an epoxy base film-like material or the like on the first clad layer 13a, and, thereafter, curing the polymer material by irradiating an ultraviolet light and heating the polymer material.

However, because it is necessary to set a refractive index of the core layer 12 higher than a refractive index of the clad layer 13, an additive agent for refractive index control, such as germanium, is added to the polymer material of the core layer 12a. The thickness of the core layer 12a can be set to 30 μm to 80 μm.

Subsequently, in the process illustrated in FIG. 6, the core layer 12a is patterned to form the core layer 12. If, for example, a negative-type photosensitive material is used as a material forming the core layer 12a, the core layer 12 can be formed by covering the core layer 12a by a photo mask (not illustrated in the figure) so that only a portion corresponding to the core layer 12 is exposed. Then, the core layer 12a is exposed and developed and, thereafter, cured by irradiating an ultraviolet light and heating the polymer material, which results in formation of the core layer 12.

Subsequently, in the process illustrated in FIG. 7, the second clad layer 13b is formed on the first clad layer 13a to cover the core layer 12 formed on the first clad layer 13a. The second clad layer 13b can be formed by applying or laminating the same polymer material as the polymer material used for forming the first clad material 13a in the process illustrated in FIG. 4, and curing the polymer material by irradiating an ultraviolet light and heating the polymer material. A total thickness of the core layer 12 and the clad layer 13 can be set to 50 μm to 200 μm.

Figure 8:
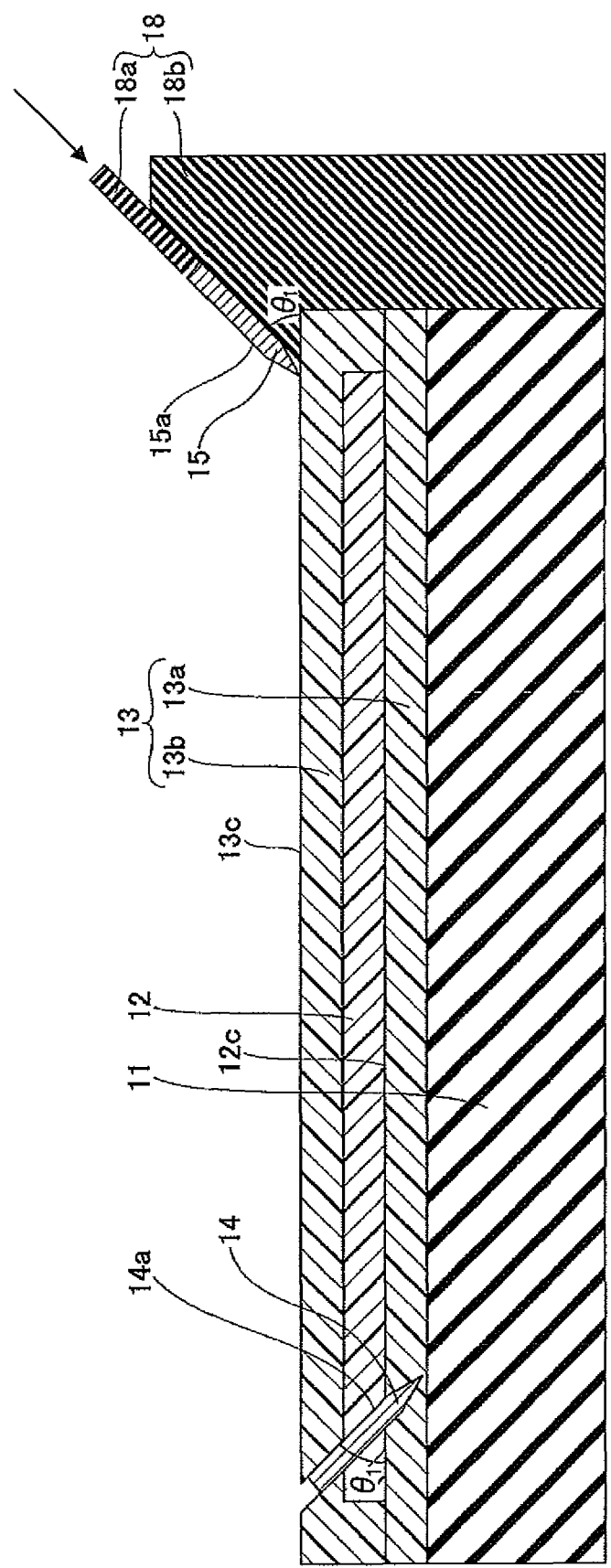
FIG. 8 is an illustration for explaining a fifth part of the manufacturing process of the optical waveguide according to the first embodiment of the present invention.

Subsequently, in the process illustrated in the FIG. 8, the optical transmission direction changing parts 14 and 15 are driven or thrust into the core layer 12 and the clad layer 13. FIG. 8 illustrates a state where the optical transmission direction changing part 14 has all ready been thrust into the core 12 but the optical transmission direction changing part 15 has not yet been thrust. The thrusting operation is performed so that the angle $\theta_1$ between each of the optical transmission direction changing surfaces 14a and 15a of the optical transmission direction changing parts 14 and 15 and the bottom surface 12c of the core layer, which is a reference plane, is set to 45 degrees.

Specifically, the optical transmission direction changing parts 14 and 15 are prepared first. Each of the optical transmission direction changing parts 14 and 15 is made of a metal block (metal piece) processed to have a shape with which the metal block can be thrust into the clad layer 13. Each of the optical transmission direction changing surfaces 14a and 15a is a flat surface, which is one of surfaces of each metal block. The optical transmission direction changing parts 14 and 15 have a mechanical strength such that the optical transmission direction changing parts 14 and 15 cannot be deformed due to a physical force generated when thrusting the optical transmission direction changing parts 14 and 15 into the core layer 12.

As a material forming the optical transmission direction changing parts 14 and 15, for example, stainless steel, aluminum, brass which is an alloy of Cu and Zn may be used. The optical transmission direction changing surfaces 14a and 15a of the optical transmission direction changing parts 14 and 15 are flat and smooth surfaces processed by physical or chemical lapping, and have a function to reflect a light. A metal layer made of a metal such as aluminum (Al), gold (Au) or the like may be formed on the optical transmission direction changing surfaces 14a and 15a of the optical transmission direction changing parts 14 and 15 by a sputtering method or a plating method. If the metal block (metal piece) used to form each of the optical transmission direction changing parts 14 and 15 has a flat and smooth surface, which sufficiently reflects a light, there is no need to apply a special process to form the optical transmission direction changing surfaces 14a and 15a.

It is desirable to make each of the optical transmission direction changing parts 14 and 15 to be sufficiently thin, that is, the width $W_1$ illustrated in FIG. 2 is preferably set sufficiently small so that the optical transmission direction changing parts 14 and 15 can be thrust into the polymer material forming the core layer 12 and the clad layer 13. Specifically, it is desirable to set the width $W_1$ to 10 μm to 100 μm. The length $H_1$ of the optical transmission direction changing parts 14 and 15 along the longitudinal direction thereof illustrated in FIG. 2 can be any size if it is sufficient for penetrating the core layer 12. The width $D_2$ illustrated in FIG. 3 can be any size if it is greater than the width $D_1$ of the core layer 12.

Subsequently, a guide jig 18 having a movable part 18a and a stationary part 18b is prepared, and is placed as illustrated in FIG. 8. The movable part 18 of the guide jig 18 is configured to be movable along an inclined surface of an inclination angle $\theta_1$ of the stationary part 18b as indicated by an arrow in the figure. The inclination angle $\theta_1$ of the inclined surface of the stationary part 18b corresponds to the angle between the bottom surface 12c of the core layer 12, which is a reference plane, and each of the optical transmission direction changing surfaces 14a and 15a of the optical transmission direction changing parts 14 and 15 after the optical transmission direction changing parts 14 and 15 are thrust into the core layer 12 and the clad layer 13. The angle $\theta_1$ is set to, for example, 45 degrees.

As illustrated in FIG. 8, the optical transmission direction changing part 15 is placed on the inclined surface of the predetermined inclination angle $\theta_1$ of the stationary part 18b so that the optical transmission direction changing surface 15a faces upward relative to the inclined surface. Then, the movable part 18a is hit or pressed in a direction indicated by the arrow so that the end of the optical transmission direction changing parts 14 and 15 reaches the predetermined position as illustrated in FIG. 2. The guide jig 18 may be provided with a stopper, which stops the movable part 18a when the optical transmission direction changing parts 14 and 15 reaches the predetermined position.

Subsequently, in the process illustrated in the FIG. 9, an encapsulation material is applied onto upper parts of the optical transmission direction changing surfaces 14a and 15a of the optical transmission direction changing parts 14 and 15 so that the top surfaces 16a and 17a of the encapsulation parts 16 and 17 and the top surface 13c of the second clad layer 13b lie substantially in the same plane. However, if the optical transmission direction changing parts 14 and 15 are fixed by a sufficient strength to the core layer 12 and the clad layer 13, there is no need to provide the encapsulation parts 16 and 17 and, in such a case, the process illustrated in FIG. 9 is not needed.

For example, an ultraviolet curable adhesive for optical coupling can be used to form the encapsulation parts 16 and 17. Because such an adhesive for optical coupling can be controlled with high accuracy of, for example, about ±0.005 mm, it is desirable to use an adhesive for optical coupling having a refraction index substantially equal to the refraction index of the core layer 12.

If an ultraviolet curable adhesive for optical coupling is used, the encapsulation parts 16 and 17 are formed by curing the ultraviolet curable adhesive for optical coupling by irradiating an ultraviolet light onto the ultraviolet curable adhesive after applying the ultraviolet curable adhesive to the upper portions of the optical transmission direction changing surfaces 14a and 15a of the optical transmission direction changing parts 14 and 15. Using such an adhesive for optical coupling to form the encapsulation parts 16 and 17 improves a mechanical strength of the portion where the optical transmission direction changing parts 14 and 15 are provided, and also improves optical coupling between the core layer 12 and each of the light-emitting element 21 and the light-receiving element 22. The optical waveguide 10 according to the first embodiment of present invention is manufactured by the above-mentioned process.

Figure 9:
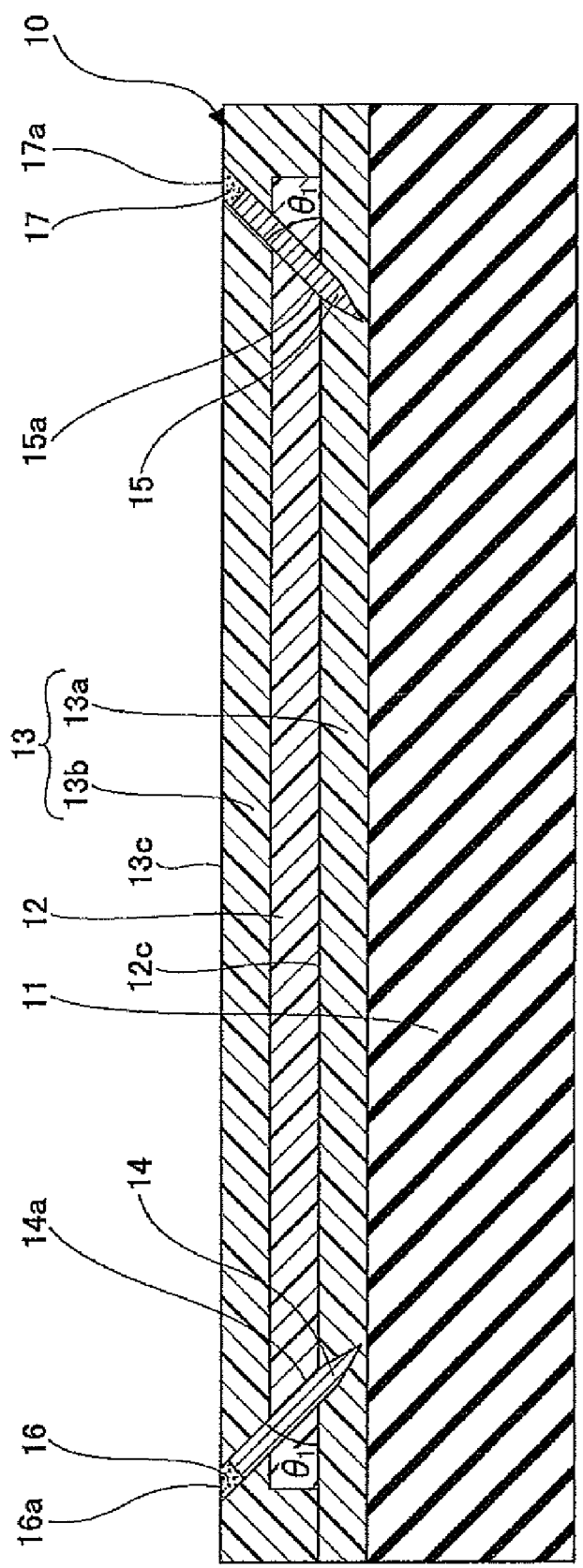
FIG. 9 is an illustration for explaining a sixth part of the manufacturing process of the optical waveguide according to the first embodiment of the present invention.

FIG. 2, FIG. 8 and FIG. 9 illustrate a shape of the optical transmission direction changing parts 14 and 15. FIGS. 10A through 10E illustrate variations in the shape of the optical transmission direction changing parts 14 and 15 according to the first embodiment of the present invention. The optical transmission direction changing parts 14 and 15 can be easily thrust into the core layer 12 and the clad layer 13 by forming the extreme ends of the optical transmission direction changing parts 14 and 15 in sharp shapes as illustrated in FIG. 10A through FIG. 10C. However, because the width $W_1$ of each of the optical transmission direction changing parts 14 and 15 is set as small as 10 μm to 100 μm in order to facilitate the thrusting operation, the optical transmission direction changing parts 14 and 15 having shapes illustrated in FIG. 10D and FIG. 10E can also be thrust into the core layer 12 and the clad layer 13. Of course, the shape of the optical transmission direction changing parts 14 and 15 is not limited to the shapes illustrated in FIG. 10A through FIG. 10E, and other shapes (preferably, sharp shapes) may be used.

As mentioned above, in the optical waveguide according to the first embodiment of the present invention, the optical transmission direction changing parts 14 and 15 are provided by thrusting them into and penetrating the core layer 12 so that the optical transmission direction changing surfaces 14a and 15a of the optical transmission direction changing parts 14 and 15 are inclined by a predetermined angle such as 45 degrees relative to a predetermined plane such as the bottom surface 12c of the core layer 12. Thus, the optical transmission direction changing parts 14 and 15 can be provided without any problem irrespective of whether the materials of the core layer 12 and the clad layer 13 forming the optical waveguide 10 are a liquid material or a film-like material.

Moreover, because there is no need to perform a process for providing a slot in the core layer 12 and the clad layer 13 and a process for forming a metal layer on an inclination part after forming the inclination part in the core layer 12 and the clad layer 13, the optical transmission direction changing parts 14 and 15 can be formed by a simple process.

Moreover, because the optical transmission direction changing parts 14 and 15 are provided by thrusting them into and penetrating the core layer 12 so that the optical transmission direction changing surfaces 14a and 15a of the optical transmission direction changing parts 14 and 15 are inclined by a predetermined angle such as 45 degrees relative to a predetermined plane such as the bottom surface 12c of the core layer 12, it is easy to direct the optical transmission direction changing surfaces 14a and 15a of the optical transmission direction changing parts 14 and 15 to face the light-emitting part 21a of the light emitting element 21 and the light-receiving part 22a of the light-receiving element 22, respectively. Thus, the optical transmission/reception device 20 can be manufactured by forming the optical waveguide 10 easily on a board on which electric circuits are formed.

Second Embodiment

Figure 11:
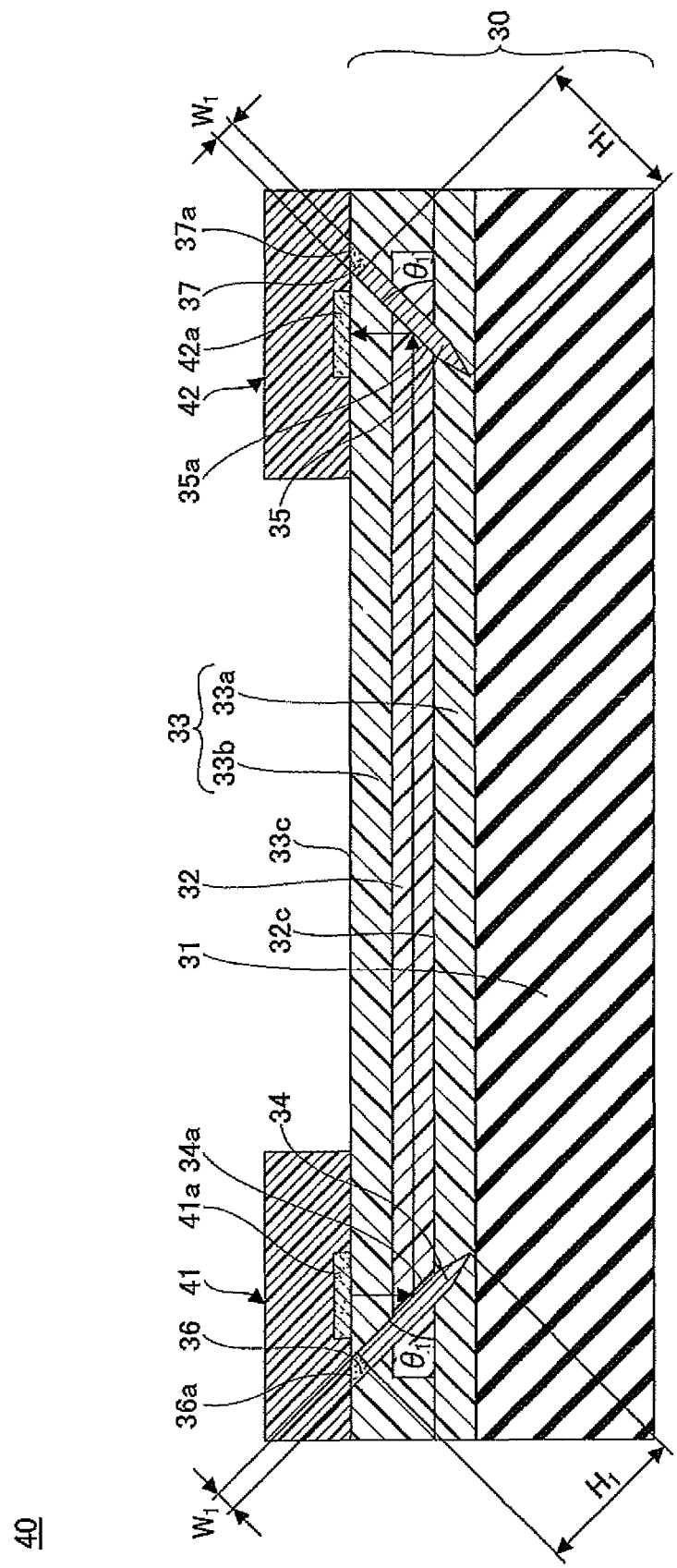
FIG. 11 is a cross-sectional view of an optical transmission/reception device having an optical waveguide according to a second embodiment of the present invention.
Figure 12:
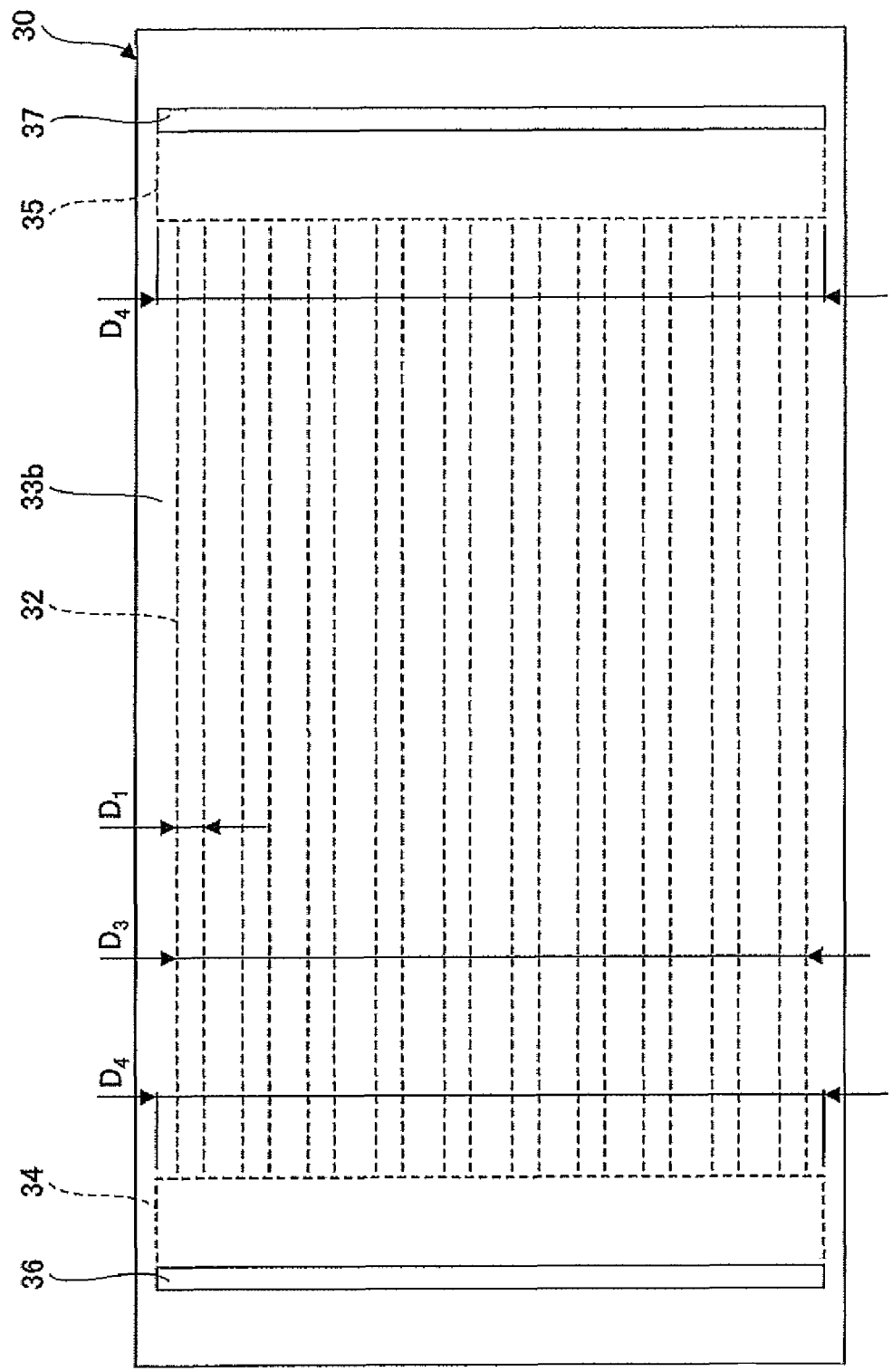
FIG. 12 is a plan view of the optical waveguide according to the second embodiment of the present invention.

FIG. 11 is a cross-sectional view of an optical transmission/reception device 40 having an optical waveguide 30 according to a second embodiment of the present invention. FIG. 12 is a plan view illustrating the optical waveguide 30 according to the second embodiment of the present invention. With reference to FIG. 11 and FIG. 12, the optical transmission/reception device 30 includes the optical waveguide 30, a light-emitting element array 41 having a plurality of light-emitting parts 41a, and a light-receiving element array 42 having a plurality of light-receiving parts 42a.

The optical waveguide 30 includes a support board 31, a plurality of core layers 32, a clad layer 33, optical transmission direction changing parts 34 and 35, and encapsulation parts 36 and 37. The clad layer 33 includes a first clad layer 33a and a second clad layer 33b.

In FIG. 11 and FIG. 12, reference numeral 32c indicates a bottom surface of the core layer 32, and reference numeral 33c indicates a top surface of the second clad layer 33b. Reference numerals 34a and 35a indicate optical transmission direction changing surfaces of the optical transmission direction changing parts 34 and 35, respectively. Reference numerals 36a and 37a indicate top surfaces of the encapsulation parts 36 and 37, respectively, Reference letter $D_1$ indicates a width of the core layer 32. Reference letter $D_3$ indicates an entire width of the plurality of core layers 32. Reference letter $W_1$ indicates a width of each of the optical transmission direction changing parts 34 and 35. Reference letter $H_1$ indicates a length of each of the optical transmission direction changing parts 14 and 15 in a longitudinal direction thereof. Reference letter $D_4$ indicates a width of each of the optical transmission direction changing parts 34 and 35.

The optical transmission direction changing surfaces 34a and 35a of the optical transmission direction changing parts 34 and 35 are arranged to form a predetermined inclination angle relative to a predetermined reference plane so that a direction of a light incident thereon can be changed. The predetermined reference plane corresponds to, for example, the bottom surfaces 32c of the core layers 32. The predetermined inclination angle corresponds to an angle $\theta_1$, which is formed between the bottom surfaces 32c of the core layers 32 and each of the optical transmission direction changing surfaces 34a and 35a of the optical transmission direction changing parts 34 and 35. The angle $\theta_1$ is set to, for example, 45 degrees.

In the optical waveguide 30, the core layers 32 and the clad layer 13 are formed on the support board 31. The core layers 32 and the clad layer 33 are made of, for example, a polymer material, such as a polyimide resin, an acrylic resin, an epoxy resin, a polyolefin resin, a polynolybornene resin, or a fluoride of the aforementioned chemical compounds, which are liquid material, or a polymer material such as an epoxy base film-like material.

The optical transmission direction changing parts 34 and 35 are provided to penetrate the core layers 12. Each of the optical transmission direction changing parts 34 and 35 is a metal block (metal piece) made of, for example, stainless steel, aluminum or brass which is an alloy of Cu and Zn. The optical transmission direction changing surfaces 34a and 35a of the optical transmission direction changing parts 34 and 35 are flat and smooth surfaces, which are processed by physical or chemical lapping to provide a function of reflecting a light. Metal layers such as, for example, Al, Au or the like may be formed on the optical transmission direction changing surfaces 34a and 35a by a sputtering method, a plating method or the like.

The shape of the optical transmission direction changing parts 34 and 35 can be the same as that illustrated in FIG. 10A through FIG. 10E. That is, it is desirable to make each of the optical transmission direction changing parts 34 and 35 to be sufficiently thin so that the optical transmission direction changing parts 34 and 35 can be thrust into the polymer material forming the core layers 12 and the clad layer 13. For example, it is desirable to set the width $W_1$ to 10 μm to 100 μm. The length $H_1$ of the optical transmission direction changing parts 34 and 35 along the longitudinal direction thereof illustrated in FIG. 11 can be any size if it is sufficient for penetrating the core layers 12. The width $D_2$ illustrated in FIG. 12 can be any size if it is greater than the width $D_3$ of the entire core layers 12.

In addition, although the angle $\theta_1$ between the bottom surfaces 32c of the core layer 32 and each of the optical transmission direction changing surfaces 34a and 35a of the optical transmission direction changing parts 34 and 35 is 45 degrees in the example illustrated in FIG. 11, it is not necessary to always set the angle $\theta_1$ to 45 degrees. The angle $\theta_1$ can be set to an arbitrary angle if such an angle provides a good optical coupling between the optical waveguide 30 and each of the light-emitting element 41 and the light-receiving element 42. The angle $\theta_1$ on a side of the light-emitting element 41 (left side in the figure) may be set to an angle different from the angle $\theta_1$ on a side of the light-receiving element 42 (right side in the figure).

The optical transmission direction changing parts 34 and 35 are encapsulated by the encapsulation parts 36 and 37. The top surfaces 36a and 37a of the encapsulation parts 36 and 37 and the top surface 33c of the second clad layer 33b are arranged to lie substantially in the same plane. The encapsulation parts 36 and 37 are made of an adhesive having a refraction index substantially equal to a refraction index of the core layers 32. The encapsulation parts 36 and 37 are provided to improve a mechanical strength of the portions in which the optical transmission direction changing parts 34 and 35 are provided, and also to improve the optical coupling between the core layers 32 and each of the light-emitting element 41 and the light-receiving element 42. However, if the optical transmission direction changing parts 34 and 35 are fixed with sufficient strength to the core layers 32 and the clad layer 33, the encapsulation parts 36 and 37 may be omitted.

A plurality of light-emitting parts 41a of the light-emitting element 41 and a plurality of light-receiving parts 42a of the light-receiving element 42 are arranged on the top surface 33c of the second clad layer 33b at positions above the optical transmission direction changing surfaces 34a and 35a of the optical transmission direction changing parts 34 and 35, respectively. The light-emitting element 41 is arranged to project lights onto the optical transmission direction changing surface 34a of the optical transmission direction changing part 34. The light-receiving element 42 is arranged to receive lights of which transmission direction is changed by the optical transmission direction changing surface 35a of the optical transmission direction changing part 35. For example, a semiconductor laser array or the like may be used as the light-emitting element 41 and a photo diode array or the like may be used as the light-receiving element 42.

In the optical transmission/reception device 40, lights projected from the light-emitting parts 21a of the light-emitting element 21 simultaneously or separately are incident on the optical waveguide 30 and transmitted to the optical transmission direction changing surface 34a of the optical transmission direction changing part 34. Then, the transmission direction of the lights is changed by about 90 degrees, as indicated by arrows in FIG. 11, by being reflected by the optical transmission direction changing surface 34a of the optical transmission direction changing part 34, and the lights are incident on the respective core layers 32. Because the refractive index of the core layers 32 is set higher than the refractive index of the clad layer 33, the lights incident on the core layers 32 are not transmitted to the clad layer 33 and propagate inside the core layers 32.

The lights propagating inside the core layers 32 reach the optical transmission direction changing surface 35a of the optical transmission direction changing part 35. Then, the transmission direction of the lights is changed by about 90 degrees by being reflected by the optical transmission direction changing surface 35a of the optical transmission direction changing part 35, and the lights are incident on the light-receiving parts 42a of the light-receiving element 42, respectively. As mentioned above, the optical transmission direction changing parts 34 and 35 have the function to change a transmission direction of lights.

As mentioned above, the optical transmission/reception device 40 having the optical waveguide 30 corresponding to a plurality of channels including the plurality of light-emitting parts 41a of the light-emitting element array 41 and the plurality of light-receiving parts 42a of the light-receiving element array 42 can be achieved. Although FIG. 12 illustrates the optical waveguide 30 corresponding to 10 channels in which 10 pieces of light-emitting parts 41a are provided in the light-emitting element array 41 and 10 pieces of light-receiving parts 42a are provided in the light-emitting element array 42, the number of channels can be any number other than 10.

A description will be given below of a manufacturing method of the optical waveguide 30 according to the second embodiment of the present invention. Because a large part of the manufacturing method of the optical waveguide 30 according to the second embodiment of the present invention is the same as the manufacturing method of the optical waveguide 10 mentioned above, a description given below is focused to differences between the manufacturing method of the optical waveguide 10 and the manufacturing method of the optical waveguide 30 while referring to the figures used for explaining the manufacturing method of the optical waveguide 10.

Figure 5:
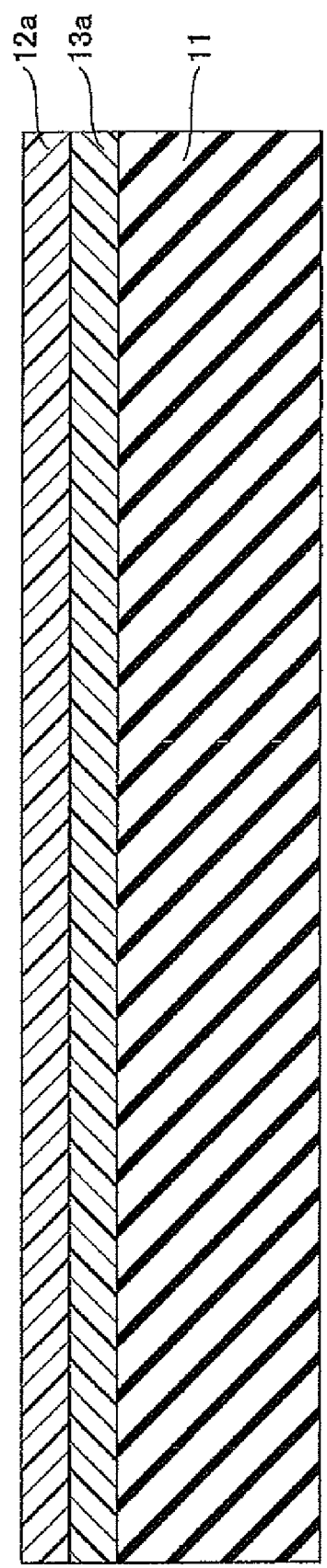
FIG. 5 is an illustration for explaining a second part of the manufacturing process of the optical waveguide according to the first embodiment of the present invention.
Figure 6:
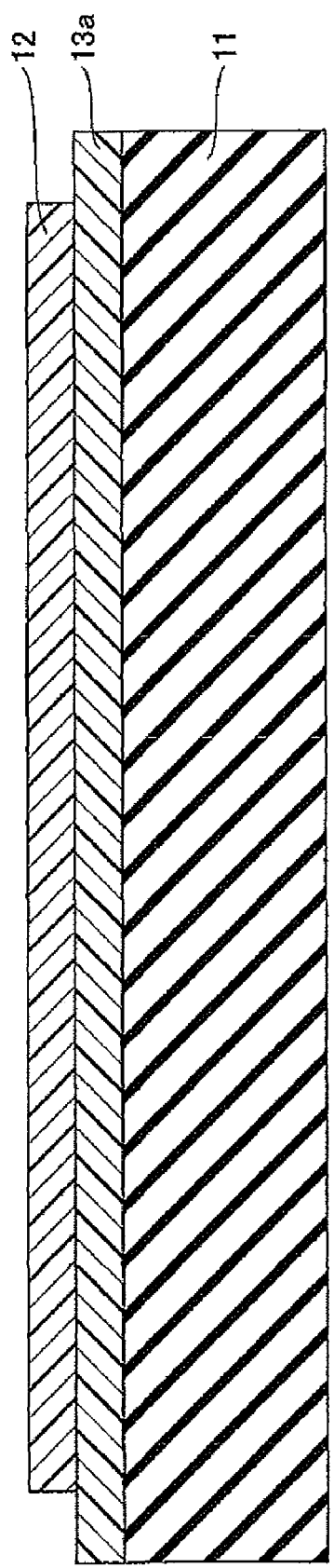
FIG. 6 is an illustration for explaining a third part of the manufacturing process of the optical waveguide according to the first embodiment of the present invention.

First, after the process corresponding to the process illustrated in FIG. 4 and FIG. 5 of the first embodiment, the plurality of core layers 32 formed on the first clad layer 33a are patterned to form the plurality of core layers 32 in the process illustrated in FIG. 6.

Figure 7:
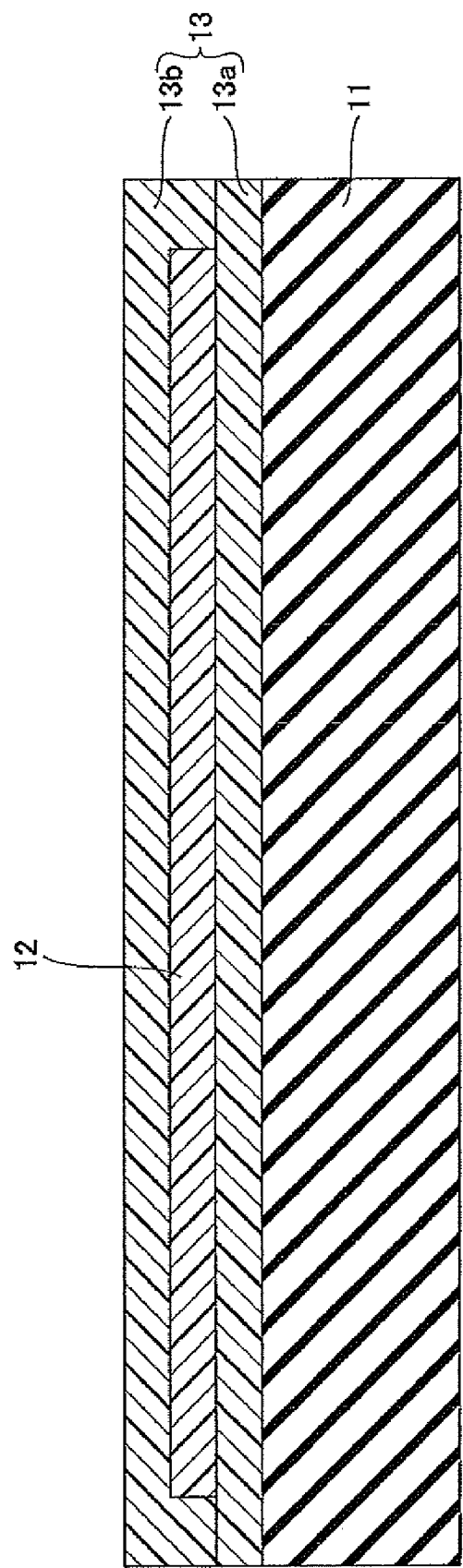
FIG. 7 is an illustration for explaining a fourth part of the manufacturing process of the optical waveguide according to the first embodiment of the present invention.

Subsequent to the process corresponding to the process illustrated in FIG. 7, in the process illustrated in the FIG. 8, the optical transmission direction changing parts 34 and 35 are driven or thrust into the core layers 32 and the clad layer 33. The thrusting operation is performed so that the angle $\theta_1$, between each of the optical transmission direction changing surfaces 34a and 35a of the optical transmission direction changing parts 34 and 35 and the bottom surfaces 32c of the core layers 32, each of which is a reference plane, is set to, for example, 45 degrees.

It is desirable to make each of the optical transmission direction changing parts 34 and 35 to be sufficiently thin, that is, the width $W_1$ illustrated in FIG. 11 is preferably set sufficiently small so that the optical transmission direction changing parts 34 and 35 can be easily thrust into the polymer material forming the core layers 32 and the clad layer 33. Specifically, it is desirable to set the width $W_1$ to 10 μm to 100 μm. The length $H_1$ of the optical transmission direction changing parts 34 and 35 along the longitudinal direction thereof illustrated in FIG. 11 can be any size if it is sufficient for penetrating the core layers 32. The width $D_4$ illustrated in FIG. 12 can be any size if it is greater than the width $D_3$ of the entire core layers 32.

The optical transmission direction changing surfaces 34a and 35a of the optical transmission direction changing parts 34 and 35 are flat and smooth surfaces processed by physical or chemical lapping, and have a function to reflect a light. Any material may be used as a material to form the optical transmission direction changing parts 34 and 35, if the material can sufficiently reflect a light. A metal layer made of a metal such as aluminum (Al), gold (Au) or the like may be formed on the optical transmission direction changing surfaces 34a and 35a of the optical transmission direction changing parts 34 and 35 by a sputtering method or a plating method. The thrusting operation of the optical transmission direction changing parts 34 and 35 is the same as that of the first embodiment, and a description thereof will be omitted.

Subsequently, in the process corresponding to the process illustrated in the FIG. 9, an encapsulation material is applied onto upper parts of the optical transmission direction changing surfaces 34a and 35a of the optical transmission direction changing parts 34 and 35 so that the top surfaces 36a and 37a of the encapsulation parts 36 and 37 and the top surface 33c of the second clad layer 33b lie substantially in the same plane. However, if the optical transmission direction changing parts 34 and 35 are fixed by a sufficient strength to the core layers 32 and the clad layer 33, there is no need to provide the encapsulation parts 36 and 37 and, in such a case, the process corresponding to the process illustrated in FIG. 9 is not needed. As mentioned above, the optical waveguide 30 corresponding to a plurality of channels of the plurality of core layers 32 is manufactured.

In the optical waveguide 30 according to the second embodiment of the present invention, similar to the optical waveguide 10 according to the first embodiment, the optical transmission direction changing parts 34 and 35 are provided by thrusting them into and penetrating the core layers 32 so that the optical transmission direction changing surfaces 34a and 35a of the optical transmission direction changing parts 34 and 35 are inclined by a predetermined angle such as 45 degrees relative to a predetermined plane such as the bottom surfaces 32c of the core layers 32. Thus, the optical transmission direction changing parts 34 and 35 can be provided without any problem irrespective of whether the materials of the core layers 32 and the clad layer 33 forming the optical waveguide 30 are a liquid material or a film-like material.

Moreover, because there is no need to perform a process for providing a slot in the core layers 32 and the clad layer 33, and a process for forming a metal layer on an inclination part after forming the inclination part in the core layers 32 and the clad layer 33, the optical transmission direction changing parts 34 and 35 can be formed by a simple process.

Moreover, because the optical transmission direction changing parts 34 and 35 are provided by thrusting them into and penetrating the core layers 32 so that the optical transmission direction changing surfaces 34a and 35a of the optical transmission direction changing parts 34 and 35 are inclined by a predetermined angle such as 45 degrees relative to a predetermined plane such as the bottom surfaces 32c of the core layer 32, it is easy to direct the optical transmission direction changing surfaces 34a and 35a of the optical transmission direction changing parts 34 and 35 to face the light-emitting parts 41a of the light emitting element array 41 and the light-receiving parts 42a of the light-receiving element array 42, respectively. Thus, the optical transmission/reception device 40 can be manufactured by forming the optical waveguide 30 easily on a board on which electric circuits are formed.

The present invention is not limited to the optical waveguide having two optical transmission direction changing parts as described in the first and second embodiments. That is, the present invention is applicable to an optical waveguide having only one optical transmission direction changing part, which corresponds to either one of the light-emitting element (array) and the light-receiving element (array).

All examples and conditional language recited herein are intended for pedagogical purposes to aid the reader in understanding the principles of the invention and the concepts contributed by the inventor to furthering the art, and are to be construed a being without limitation to such specifically recited examples and conditions, nor does the organization of such examples in the specification relates to a showing of the superiority and inferiority of the invention. Although the embodiment (s) of the present invention (s) has(have) been described in detail, it should be understood that the various changes, substitutions, and alterations could be made hereto without departing from the spirit and scope of the invention.

What is claimed is:

1. An optical waveguide comprising:
a first clad layer;
a core layer formed on said first clad layer;
a second clad layer formed on said core layer; and an optical transmission direction changing part configured and arranged to change a transmission direction of a light transmitting through said core layer, wherein said optical transmission direction changing part is formed of a metal piece having a sharp shape so that said optical transmission direction changing part penetrates through said second clad layer and said core layer, and an optical transmission direction changing surface of said optical transmission direction changing part inclines relative to a predetermined reference plane by a predetermined angle, and wherein said optical transmission direction changing part has a sharply-angled extreme end being stuck into said first clad layer.

2. The optical waveguide as claimed in claim 1, further comprising an encapsulation part that encapsulates said optical transmission direction changing part so that a top surface of said encapsulation part and a top surface of said second clad layer lie substantially in the same plane.

3. The optical waveguide as claimed in claim 2, wherein said encapsulation part is made of an encapsulation material having a refraction index substantially equal to a refraction index of said core layer.

4. The optical waveguide as claimed in claim 1, wherein a plurality of said core layers are provided on said first clad layer, and said second clad layer covers the plurality of said core layers.

5. The optical waveguide as claimed in claim 1, wherein a width of said optical transmission direction changing part ranges from 10 μm to 100 μm.

6. The optical waveguide as claimed in claim 1, wherein said optical transmission direction changing part is in contact with said first clad layer, said core layer and said second clad layer.

7. An optical transmission/reception device comprising:
a light-emitting element;
a light-receiving element;
a board; and
an optical waveguide formed on said board and arranged between said light-emitting element and said light-receiving element, said optical wave guide having two optical transmission direction changing parts that change a transmission direction of a light transmitting through said optical waveguide, wherein said light-emitting element is arranged on said optical waveguide to project a light onto one of said optical transmission direction changing parts, and said light-receiving element is arranged on said optical waveguide to receive the light of which transmission direction is changed by the other of said optical transmission direction changing parts, and wherein each of said optical transmission direction changing parts is formed of a metal piece having a sharp shape so that each of said optical transmission direction changing parts penetrates through a core layer of said optical waveguide, and wherein said optical waveguide includes a first clad layer on which said core layer is formed and a second clad layer formed on said core layer, and each of said optical transmission direction changing parts has a sharply-angled extreme end being stuck into said first clad layer.

8. The transmission/reception device as claimed in claim 7, wherein a width of each of said optical transmission direction changing parts ranges from 10 μm to 100 μm.

9. The transmission/reception device as claimed in claim 7, wherein said optical waveguide includes a first clad layer on which said core layer is formed and a second clad layer formed on said core layer, and each of said optical transmission direction changing parts is in contact with said first clad layer, said core layer and said second clad layer.

* * * * *